United States Patent [19]

Wachter

[11] 4,147,382
[45] Apr. 3, 1979

[54] CONNECTING PIECE FOR A BRANCH DUCT TO A SUBSTANTIALLY ROUND AIR CONDITIONING DUCT

[75] Inventor: Erich Wachter, Zurich, Switzerland

[73] Assignee: Sulzer Brothers Limited, Winterthur, Switzerland

[21] Appl. No.: 764,870

[22] Filed: Feb. 2, 1977

[30] Foreign Application Priority Data

Feb. 3, 1976 [CH] Switzerland ............ 1300/76

[51] Int. Cl.² ............................................. F16L 55/00
[52] U.S. Cl. ..................................... 285/189; 285/424
[58] Field of Search ..................... 285/189, 176, 424; 138/DIG. 4

[56] References Cited

U.S. PATENT DOCUMENTS

| 1,737,633 | 12/1929 | Beach | 285/176 |
|---|---|---|---|
| 3,404,540 | 10/1968 | Bryans et al. | 285/176 X |
| 3,421,781 | 1/1969 | Spurk | 285/176 |
| 3,508,770 | 4/1970 | Cassel | 285/189 |
| 3,672,706 | 6/1972 | Chilcoat | 285/184 |
| 3,892,049 | 7/1975 | Adams | 285/424 |
| 3,920,271 | 11/1975 | Bluestone | 285/176 |

FOREIGN PATENT DOCUMENTS 732477 3/1943 Fed. Rep. of Germany ........... 285/189
2224454 11/1973 Fed. Rep. of Germany ........... 285/189

Primary Examiner—Dave W. Arola
Attorney, Agent, or Firm—Kenyon & Kenyon, Reilly, Carr & Chapin

[57] ABSTRACT

The connecting piece is formed with a substantially flat planar flange to fit about a longitudinally extending slot in the rounded air conditioning duct. Due to the absence of any significant curvature of the duct in the area of the slot, the flat flange requires no rounding to conform to the curvilinear periphery of the air conditioning duct. The connecting piece also has a body of tapering shape which extends from the flange to a rounded connecting pipe.

9 Claims, 7 Drawing Figures

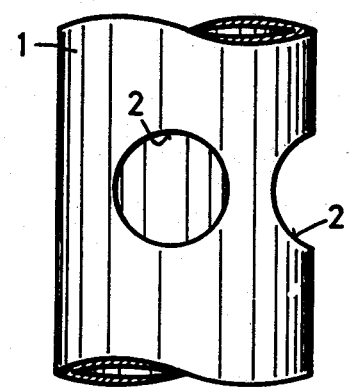
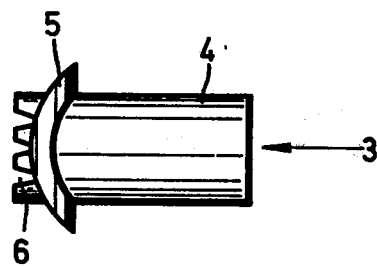
Fig.1
PRIOR ART
Fig.2
PRIOR ART

CONNECTING PIECE FOR A BRANCH DUCT TO A SUBSTANTIALLY ROUND AIR CONDITIONING DUCT

This invention relates to a connecting piece for ducts and, more particularly, to a connecting piece for a branch duct of a substantially rounded air conditioning duct.

Heretofore, in order to fit a branch duct on a substantially round air conditioning duct, a round opening has usually been formed in the air conditioning duct and a cylindrical connecting piece with a saddle shape flange portion has been used between the air-conditioning duct and the branch duct. However, this type of construction is cumbersome and relatively expensive. Moreover, various problems arise with respect to the tightening and fitting of a saddle-shaped flange of a connecting piece to a round saddle-shaped opening in an air conditioning duct.

Further, where the air conditioning ducts have been provided with openings of different diameters, it has been necessary to stock a number of different sizes of cylindrical connecting pieces with corresponding diameters and saddle flanges. Still further, the connection of a cylindrical connecting piece to a duct at an aerodynamically favorable inclination has been possible or can only be achieved with considerable effort.

Accordingly, it is an object of the invention to provide a new and improved connecting piece or a rounded air conditioning duct which does not require a saddle shaped connecting flange.

It is another object of the invention to provide a connecting piece for a rounded air conditioning duct which can be fitted to an opening in the duct in a flat manner.

It is another object of the invention to provide a connecting piece for a rounded air conditioning duct which can be secured to the duct in a simple and relatively inexpensive manner.

It is another object of the invention to provide a connecting piece for a rounded duct which can be adapted for different size openings in the duct.

It is another object of the invention to provide a connecting piece for a rounded duct which can be inclined to the axis of the duct in an aerodynamically favorable inclination.

Briefly, the invention provides a connecting piece for securement to an air conditioning duct of rounded cross-section wherein the connecting piece has a flat planar flange at one end to define a slot-shaped opening for fitting over a similar slot-shaped opening in the air conditioning duct. For this purpose, the slot-shaped opening in the air conditioning duct extends longitudinally of the duct, that is, the opening is disposed at right angles to the peripheral direction of the duct.

The connecting piece further has a cylindrical connecting pipe at an opposite end to define a passage of circular shape and a body of tapering shape between the flange and the connecting pipe which defines a continuous passage from the slot-shaped opening of the connecting piece to the passage within the connecting pipe.

The slot-shaped opening in the flange of the connecting piece has a cross-section at least as large as the cross-sectional area of the passage of the connecting pipe.

In addition, a layer of resilient material can be mounted on the flange in facing relation to the air conditioning duct so as to compensate for any small deviations or uneven spots in the vicinity of the opening of the duct.

Thus, instead of varying the diameter of the round opening of a duct in accordance with the prior art, only the slot length of a duct for a given selected slot width need be varied. In this case, the slot width is chosen in such a way that the curvature of the peripheral surface of the air conditioning duct may be ignored. Consequently, the time consuming and cumbersome manufacture of saddle shaped connecting pieces having saddle flanges which are particularly difficult to manufacture is eliminated. As a result, it is possible to work with practically flat connecting flanges.

These and other objects and advantages of the invention will become more apparent from the following detailed description and appended claims taken in conjunction with the accompanying drawings in which:

FIG. 1 illustrates a perspective view of an air conditioning duct having a substantially rounded cross section with two round openings in accordance with the prior art;

FIG. 2 illustrates a perspective view of a corresponding cylindrical connecting piece for the duct of FIG. 1;

Figure 3:
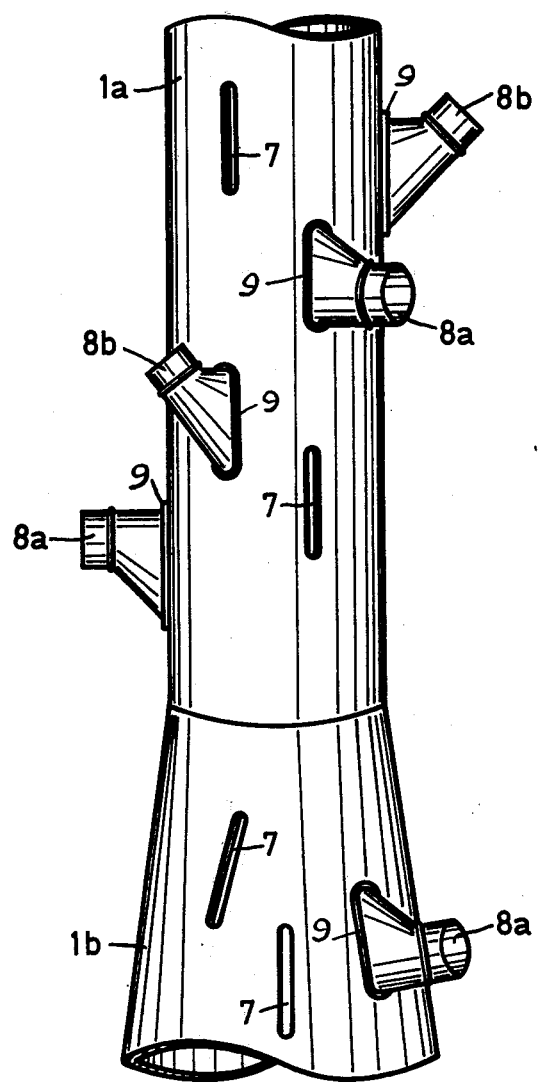
FIG. 3 illustrates a perspective view of an air conditioning duct having a substantially round cross-section with different embodiments of connecting pieces in accordance with the invention.

Referring to FIGS. 1 and 2, in accordance with a known prior art technique, an air conditioning duct of rounded cross-section, for example of cylindrical cross-section, is usually provided with round openings 2 while a corresponding connecting piece 3 is generally made of a cylindrical connecting pipe 4 and a saddle-shaped flange 5. In order to mount the connecting pipe 4, the edge of the pipe can be provided with tabs 6 which are cut out in a zig-zag manner. After the connecting pipe is inserted into an opening 2 of the duct 1, a workman must usually place his arm into the hollow space of the connecting pipe 4 in order to fold or bend the zig-zag shape tabs 6 with a tool in order to secure the connecting piece 3 in place. This folding or bending operation, however, has been very time consuming and cumbersome and not very satisfying. Thus, the fabricated connection does not usually withstand any considerable bending load.

Referring to FIG. 3, in accordance with the invention, an air conditioning duct 1 of rounded cross-section, for example with a cylindrical section 1a and a conical section 1b is provided with slot shaped openings 7. These openings are arranged longitudinally of the axis of the duct 1, i.e. the openings 7 are arranged at right angles to the peripheral direction of the duct 1. As a practical matter, the slot shaped openings 7 are so narrow in relation to the circumference of the duct 1 that the curvature or incision, as compared with the structure as shown in FIG. 1, may be ignored.

As shown in FIG. 3, various types of connecting pieces 8a, 8b are fastened to the air conditioning duct 1 over the respective openings 7. The connecting pieces 8a are used to provide a connection at right angles to the duct 1 whereas the connecting pieces 8b are used to provide an inclined connection to the duct 1.

Figure 4:
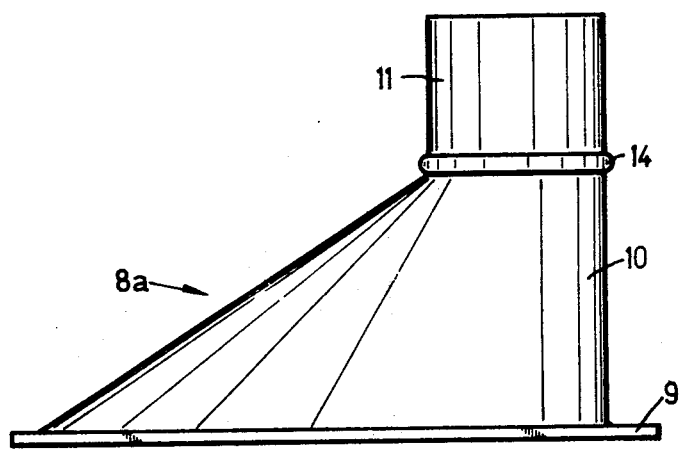
FIG. 4 illustrates a side view of a connecting piece in accordance with the invention.
Figure 6:
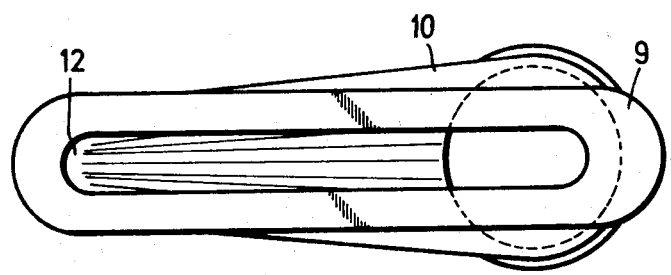
FIG. 6 illustrates a bottom view of the connecting piece of FIG. 4 taken in the direction of arrow VI in FIG. 4.

Referring to FIG. 4, each connecting piece 8a is formed with a flat planar flange 9 at one end which is secured to the duct 1 (FIG. 3). The flange 9 as shown lies in substantially one plane and defines a slot shaped opening 12 (FIG. 6). For example, the flange 9 has an outer periphery disposed at all positions thereon substantially equidistantly from the duct 1 directly therebeneath. In addition, the connecting piece 8a has a body 10 which is tapered and a cylindrical connecting pipe 11 which is secured to the body 10. As shown, the connecting pipe 11 is cylindrical and defines a passage of circular shape while the body 10 is located between the pipe 11 and the flange 9 in order to define a continuous passage from the opening 12 to the passage of the pipe 11.

The width of the connecting flange 9 and the width of the slot-shaped opening 12, respectively, are in such relation to the circumference of the air conditioning duct 1, that the curvature in the slot area of the air conditioning duct 1 may be ignored.

Figure 5:
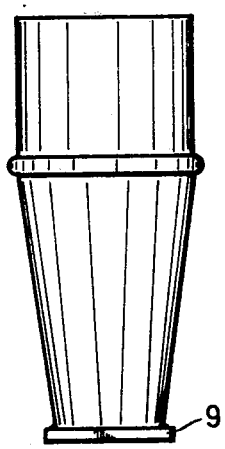
FIG. 5 illustrates a side view of the connecting piece of FIG. 4.

As shown in FIG. 4, the body 10 tapers from the flange 9 towards the pipe 11 in a decreasing fashion longitudinally of the slot while, as shown in FIG. 5, increasing transversely of the slot 12.

The connecting pipe 11 is connected to the body about a seam 14, for example, by bending, folding or soldering.

Figure 7:
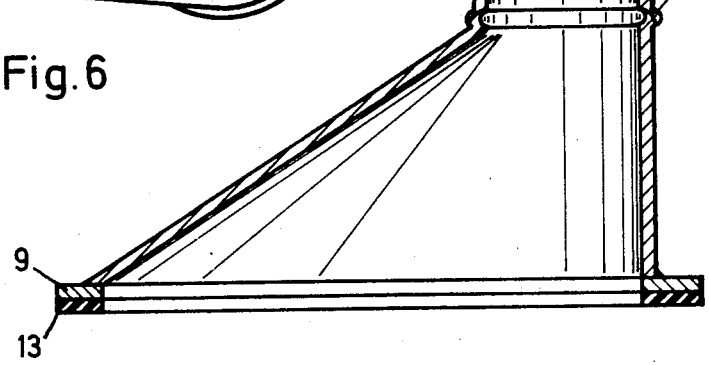
FIG. 7 illustrates a modified embodiment of the connecting piece in accordance with the invention.

Referring to FIG. 7, the flange of a connecting piece may be provided with a layer of resilient material 13 such as rubber, flexible foam, asbestos or a corking compound, in order to compensate for possible uneven spots in the vicinity of the slot shaped openings 7 of a duct 1.

Referring to FIG. 6, the cross-sectional area of the slot shaped opening 12 of the connecting piece 8 is equal to or larger than the cross-sectional area of the passage defined by the cylindrical connecting pipe 11. The relation between the slot width and the slot length is such that the flow losses at the passage from the slot shaped opening 12 to the circular opening in the pipe 11 are as small as possible. In order to adjust the connecting pipe 11 to different diameters, the lengths of the slot 12 are varied.

The securement of the connecting pieces 8 to the air conditioning duct 1 can be accomplished by any suitable conventional means, such as by blind riveting, by adhesive bonding, screw fastening or soldering.

The connecting pieces may be manufactured from flat surface materials such as plates and the like. The material is preferably transformed into a desired shape by bending.

The invention thus provides a connecting piece which has a slot shaped opening which lies substantially in one plane and has a substantially straight longitudinal extension. Thus, the connecting piece may be easily secured to a duct of rounded cross sectional shape.

What is claimed is:

1. In combination
    an air-conditioning duct having a substantially rounded cross-section and at least one slot-shaped opening extending longitudinally thereof;
    a connecting piece having a flat-planar flange disposed about said opening of said duct and defining a slot-shaped opening aligned with said opening of said duct, said flange having an outer periphery disposed at all positions thereon substantially equidistantly from said duct directly therebeneath; and
    means securing said connecting piece to said duct wherein each of said connecting flange and said slot-shaped opening in said duct have a width relative to the circumference of said duct that the curvature in the slot area of said duct can be ignored.

2. The combination as set forth in claim 1 wherein said connecting piece includes a cylindrical connecting pipe and a body of tapering shape between said flange and said connecting pipe, said body defining a continuous passage from said opening in said flange to said connecting pipe.

3. The combination as set forth in claim 2 wherein said opening in said flange has a cross-sectional area at least as large as the cross-sectional area of said connecting pipe.

4. The combination as set forth in claim 2 which further comprises a layer of resilient material on said flange in facing relation to said duct.

5. The combination as set forth in claim 2 wherein said body tapers from said flange towards said pipe in a decreasing fashion longitudinally of said slot while increasing transversely of said slot.

6. The combination as set forth in claim 1 wherein said flange is secured to said duct.

7. In combination
    an air-conditioning duct having a substantially rounded cross-section and at least one longitudinally extending slot-shaped opening in a periphery thereof;
    a connecting piece for a branch duct mounted on said air-conditioning duct, said connecting piece having a flat planar flange at one end disposed about said opening in said air-conditioning duct and defining a slot-shaped opening aligned with said opening of said duct and a connecting pipe at an opposite end, said flange having an outer periphery disposed at all positions thereon substantially equidistantly from said duct directly therebeneath, and wherein each of said flange and said slot-shaped opening in said duct have a width relative to the circumference of said duct that the curvature in the slot area of said duct can be ignored; and
    means securing said connecting piece to said duct.

8. The combination as set forth in claim 7 which further comprises a layer of resilient material on said flange in facing relation to said duct.

9. The combination as set forth in claim 7 wherein said connecting piece has a body between said flange and said connecting pipe, said body tapering from said flange towards said pipe in a decreasing fashion longitudinally of said slot while increasing transversely of said slot.

* * * * *